US010831857B2

(12) United States Patent
Surale et al.

(10) Patent No.: US 10,831,857 B2
(45) Date of Patent: Nov. 10, 2020

(54) SECURE AND SCALABLE DATA INGESTION PIPELINE

(71) Applicant: Plex Systems, Inc., Troy, MI (US)

(72) Inventors: Pradeep Padmakar Surale, Aurangabad (IN); Rahul Borkar, Pune (IN)

(73) Assignee: Plex Systems, Inc., Troy, MI (US)

( * ) Notice: Subject to any disclaimer, the term of this patent is extended or adjusted under 35 U.S.C. 154(b) by 39 days.

(21) Appl. No.: 16/122,555

(22) Filed: Sep. 5, 2018

(65) Prior Publication Data

US 2019/0073373 A1 Mar. 7, 2019

Related U.S. Application Data

(60) Provisional application No. 62/554,821, filed on Sep. 6, 2017.

(51) Int. Cl.
| | | |
|---|---|---|
| H04L 29/06 | (2006.01) | |
| G06F 16/958 | (2019.01) | |
| H04L 12/46 | (2006.01) | |
| H04L 29/08 | (2006.01) | |

(Continued)

(52) U.S. Cl.
CPC ........ *G06F 16/958* (2019.01); *G06F 16/9535* (2019.01); *H04L 12/4633* (2013.01); *H04L 12/4641* (2013.01); *H04L 63/0428* (2013.01); *H04L 63/083* (2013.01);
(Continued)

(58) Field of Classification Search
CPC .... G06F 16/9535; G06F 16/958; G06F 21/31; G06F 21/44; G06F 21/6245; G06F 21/62; G06F 21/72; H04L 12/4633; H04L 12/4641; H04L 63/0428; H04L 63/083; H04L 63/166; H04L 63/168;
(Continued)

(56) References Cited

U.S. PATENT DOCUMENTS

| | | | |
|---|---|---|---|
| 2003/0142818 A1* | 7/2003 | Raghunathan | G06F 21/72 380/1 |
| 2015/0180656 A1* | 6/2015 | Rich | H04L 9/083 713/168 |

(Continued)

FOREIGN PATENT DOCUMENTS

WO   WO-2016/138067 A1   9/2016

OTHER PUBLICATIONS

International Preliminary Report on Patentability for International Appl. No. PCT PCT/US2018/049572, dated Mar. 19, 2020.

(Continued)

*Primary Examiner* — Le H Luu
(74) *Attorney, Agent, or Firm* — Foley & Lardner LLP

(57) ABSTRACT

A system and method for a secure and scalable data collection and ingestion data pipeline is discussed. The data pipeline provides secure ingestion of data into internet-of-things (IoT) platform, while providing high throughput, replication, and fault-tolerance, which makes it suitable for large scale systems where data can be received from millions or billions of devices, sensors, or clients. In addition, the data pipeline provides a platform for real time event generation and data analysis. Further the data pipeline reduces operational costs and platform-as-a-service (PAAS) vendor dependencies.

20 Claims, 9 Drawing Sheets

(51) Int. Cl.
*G06F 16/9535* (2019.01)
*H04W 4/70* (2018.01)

(52) U.S. Cl.
CPC .......... *H04L 63/166* (2013.01); *H04L 63/168* (2013.01); *H04L 67/12* (2013.01); *H04W 4/70* (2018.02)

(58) Field of Classification Search
CPC ... H04L 63/145; H04L 67/12; H04L 65/4084; H04L 9/083; H04W 4/70
See application file for complete search history.

(56) References Cited

U.S. PATENT DOCUMENTS

| | | | |
|---|---|---|---|
| 2016/0050199 A1* | 2/2016 | Ganesan | G06F 21/31 726/7 |
| 2016/0294548 A1 | 10/2016 | Qian et al. | |
| 2017/0195386 A1* | 7/2017 | Nathan | H04L 65/4084 |
| 2017/0302589 A1* | 10/2017 | Leafe | G06F 21/44 |
| 2017/0357814 A1* | 12/2017 | Mahaffey | H04L 63/145 |
| 2018/0032744 A1* | 2/2018 | Cavanaugh | G06F 21/62 |
| 2018/0144153 A1* | 5/2018 | Pead | G06F 21/6245 |

OTHER PUBLICATIONS

International Search Report and Written Opinion for International Application No. PCT/US2018/049572, dated Dec. 5, 2018.

* cited by examiner

SECURE AND SCALABLE DATA INGESTION PIPELINE

CROSS REFERENCE TO RELATED APPLICATIONS

This application claims priority to U.S. Provisional Patent Application No. 62/554,821, entitled "SECURE SCALABLE DATA INGESTION PIPELINE," filed, Sep. 6, 2017, which is incorporated herein by reference in its entirety.

FIELD OF THE DISCLOSURE

The present disclosure is generally directed to networking. In particular, the present disclosure describes techniques for secure and scalable data collection and ingestions pipelines.

BACKGROUND OF THE DISCLOSURE

An Internet-of-Things (IoT) platform can receive data from several devices or systems over a network. The IoT platform can store, process, or transmit the received data. In some instances, the amount of data received can be a function of the number of IoT devices or system from which the IoT platform receives data.

BRIEF SUMMARY OF THE DISCLOSURE

IoT platforms can face several challenges, such as collecting stream data from a large number of devices and events, storing the data stream in a persistent buffer, and providing the stored data for further processing and analysis. An increasing number of IoT devices are connected to and provide data over the Internet, thereby increasing security risks. The following discusses techniques and systems for a secure and scalable IoT data collection and ingestion data pipeline. The data pipeline provides secure ingestion of data into the IoT platform, while providing high throughput, replication, and fault-tolerance, which makes it suitable for large scale systems where data can be received from millions or billions of devices, sensors, or clients. In addition, the data pipeline provides a platform for real time event generation and data analysis. Further the data pipeline reduces operational costs and platform-as-a-service (PAAS) vendor dependencies.

In certain embodiments, a method for securely ingesting data from a plurality of devices over one or more networks can include establishing, by a data pipeline platform executing on one or more servers, a secure tunnel connection with a plurality of devices, each of the of the plurality of devices assigned by the data pipeline platform a unique application programming interface (API) key. The method further includes receiving, by the data pipeline platform, an application layer request over the secure tunnel connection via one or more networks from a device of the plurality of devices, the application layer request comprising an encrypted message from the device. The method also includes determining, by the data pipeline platform, that the application layer request comprises the unique API key assigned to the device in a predetermined authentication header of the application layer request. The method additionally includes accepting, by the data pipeline platform, responsive to the determination, the application layer request. The method further includes using, by the data pipeline platform responsive to accepting the request, the unique API key of the device to determine an encryption key to decrypt the encrypted message to a message. The method also includes storing, by the data pipeline platform responsive to accepting the application layer request, the message to a first partition of a plurality of partitions corresponding to an input data topic.

In some embodiments, the method further includes processing, by a data stream processor, the message as input from the first partition and storing an output from processing to a second partition of the plurality of partitions corresponding to an output data topic. In some embodiments the method further includes subscribing, by a plurality of consumer applications, to the output data topic of the second partition receive output data published to the second partition. In some embodiments, the method further includes obtaining, by a consumer application, a batch of records at a time from the output data topic of the second partition. In some embodiments, the plurality of devices comprises one or more of the following: a hub device, an Internet of Things (IoT) device, a sensor, a vehicle and a computing device.

In some embodiments the data pipeline platform executes on one or more servers in one of a cloud or Software-As-A-Service computing environment and provides an API for the plurality of devices to communicate with the data pipeline platform. In some embodiments, the method further includes authenticating, by the data pipeline platform, the plurality of devices based at least on the unique API key. In some embodiments, the method further includes determining the encryption key as a symmetric key comprising the unique API key combined with a hash of a unique device identifier, such as a Media Access Control (MAC) address of the device. In some embodiments, each of the plurality of partitions comprises an ordered immutable sequence of records. In some embodiments, the method further includes maintaining, by the data pipeline platform, records in each of the plurality of partitions for a configured lifetime to enable re-consumption by one or more consumer applications.

In some embodiments, a system for securely ingesting data from a plurality of devices over one or more networks includes a data pipeline platform executing on one or more servers. The data pipeline platform is configured to establish a secure tunnel connection with a plurality of devices, each of the plurality of devices assigned by the data pipeline platform a unique application programming interface (API) key. The data pipeline platform is also configured to receive an application layer request over the secure tunnel connection via one or more networks from a device of the plurality of devices, the application layer request comprising an encrypted message from the device. The data pipeline platform is also configured to determine that the application layer request comprises the unique API key assigned to the device in a predetermined authentication header of the application layer request. The data pipeline platform is also configured to accept the application layer request responsive to the determination, and use the unique API key of the device to determine, responsive to accepting the application layer request, an encryption key to decrypt the encrypted message to a message. The data pipeline platform is also configured to store, responsive to accepting the application layer request, the message to a first partition of a plurality of partitions corresponding to an input data topic.

In some embodiments, the system further includes a data stream processor configured to process the message as input from the first partition and storing an output from processing to a second partition of the plurality of partitions corresponding to an output data topic. In some embodiments, a plurality of consumer applications are subscribed to the output data topic of the second partition to receive output data published to the second partition. In some embodiments, data pipeline platform is also configured to obtain, by a consumer application, a batch of records at a time from the output data topic of the second partition. In some embodiments, the plurality of devices comprises one or more of the following: a hub device, an Internet of Things (IoT) device, a sensor, a vehicle and a computing device. In some embodiments, the data pipeline platform is configured to execute on the one or more servers in one of a cloud or Software-As-A-Service computing environment and provide an API for the plurality of devices to communicate with the data pipeline platform.

In some embodiments, the data pipeline platform is further configured to authenticate the device based at least on the unique API key. In some embodiments, the data pipeline platform is further configured to determine the encryption key as a symmetric key comprising the unique API key combined with a hash of a unique device identifier, such as a Media Access Control (MAC) address of the device. In some embodiments, each of the plurality of partitions comprises an ordered immutable sequence of records. In some embodiments, the data pipeline platform is further configured to maintain records in each of the plurality of partitions for a configured lifetime to enable re-consumption by one or more consumer applications.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a scalable data ingestion pipeline.

A. Computing and Network Environment

Figure 1A:
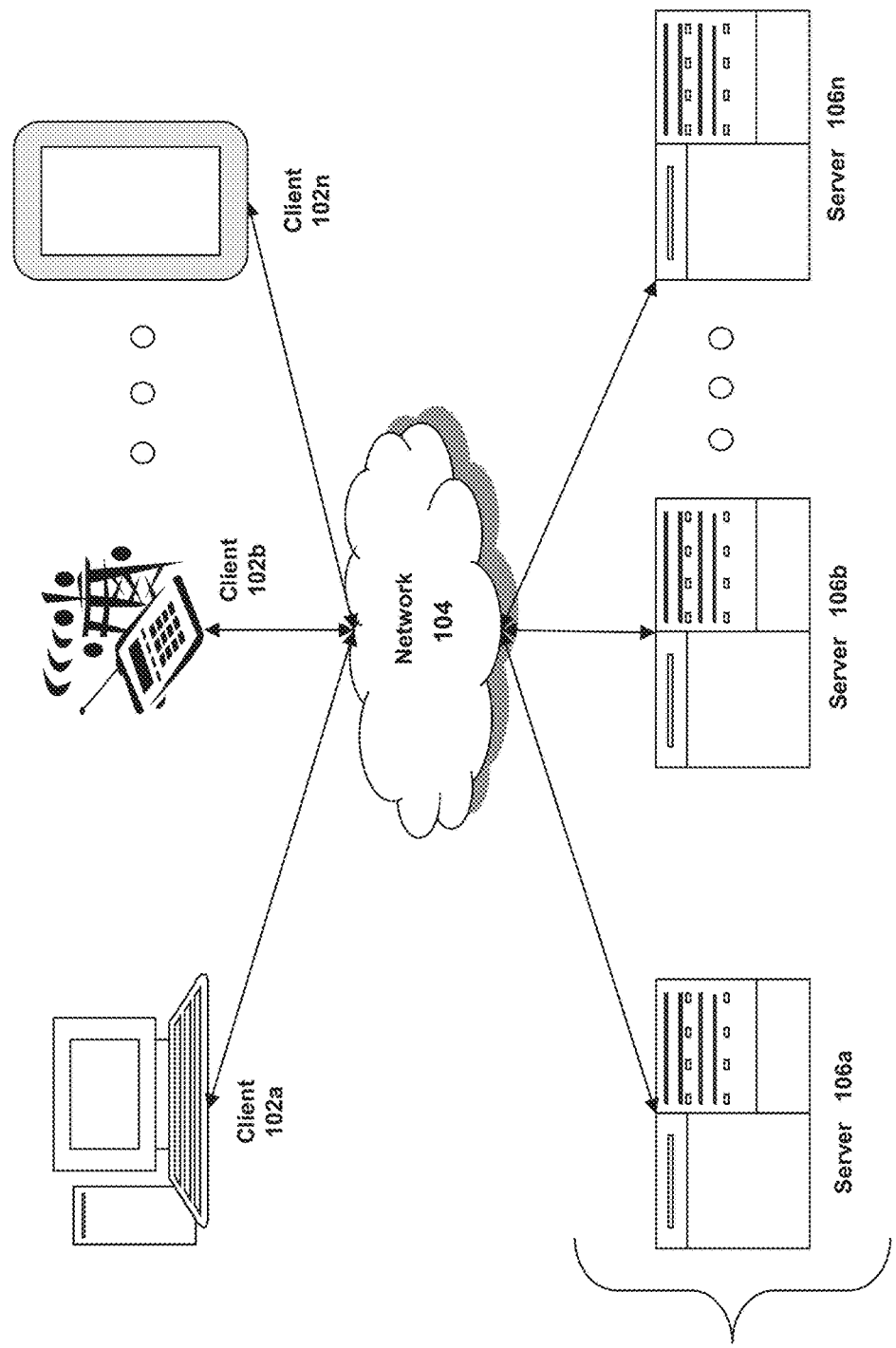
FIG. 1A is a block diagram depicting an embodiment of a network environment comprising a client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
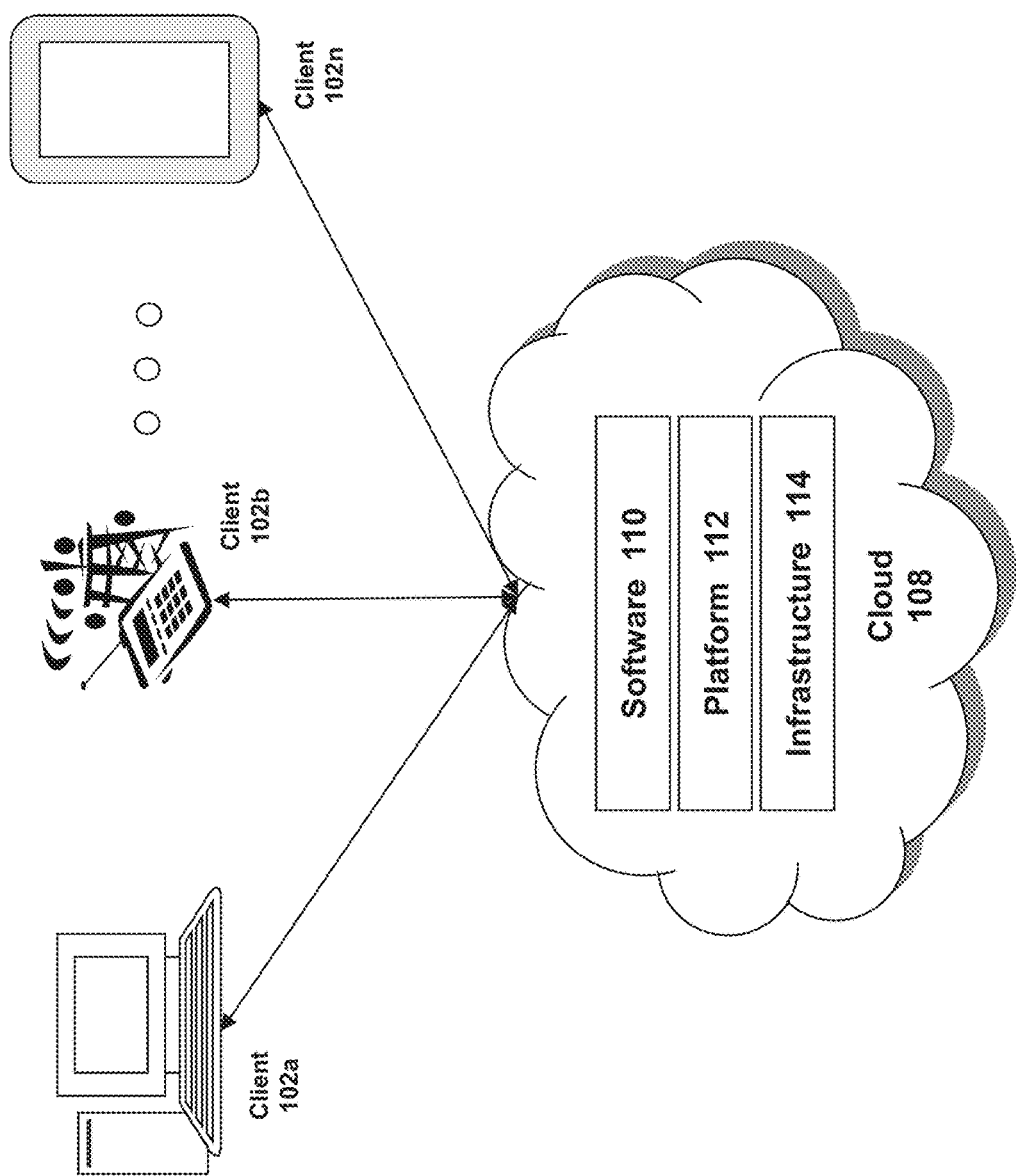
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail configured lifetimeAPI, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
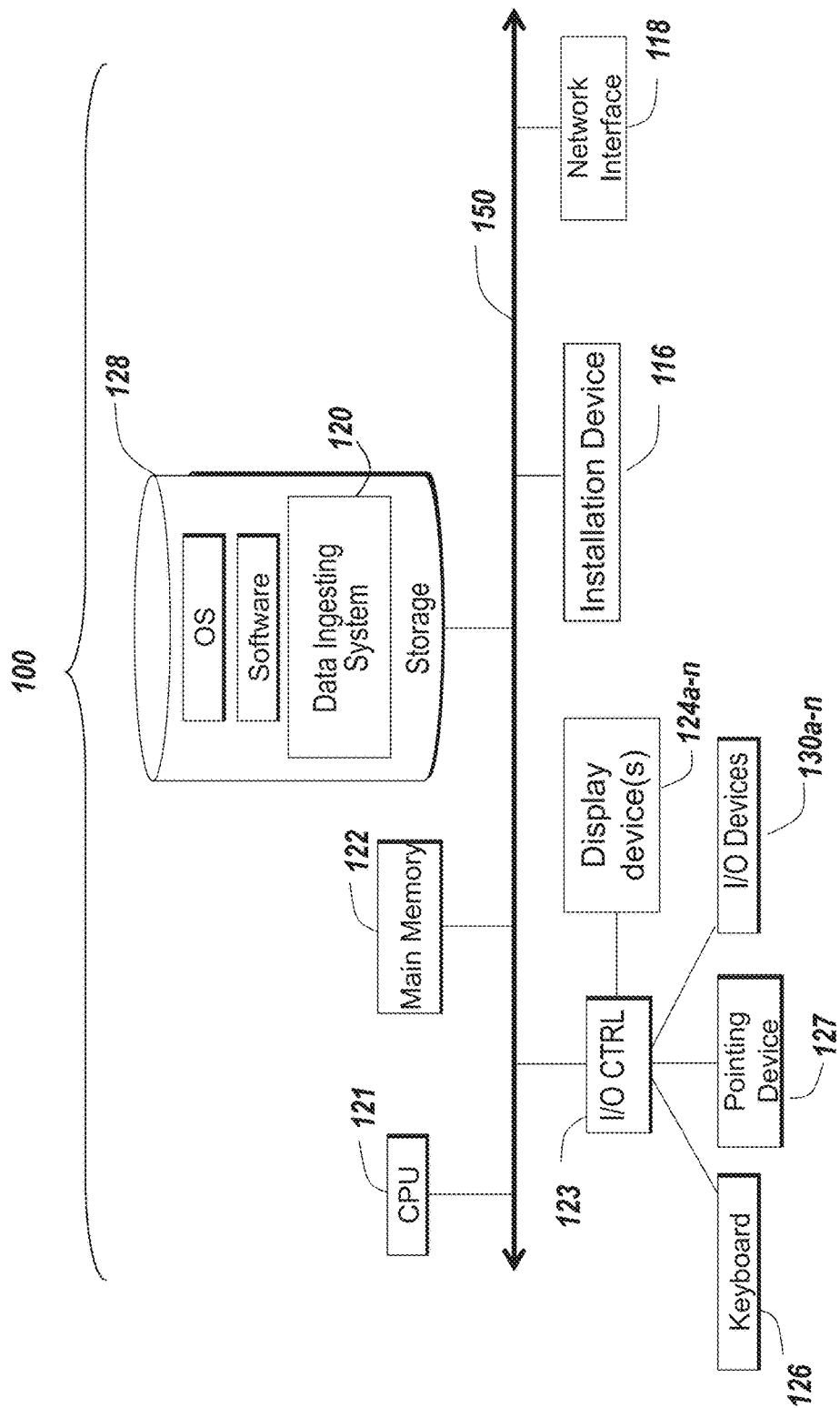
FIGS. 1C and 1D are block diagrams depicting embodiments of computing devices useful in connection with the methods and systems described herein.
Figure 1D:
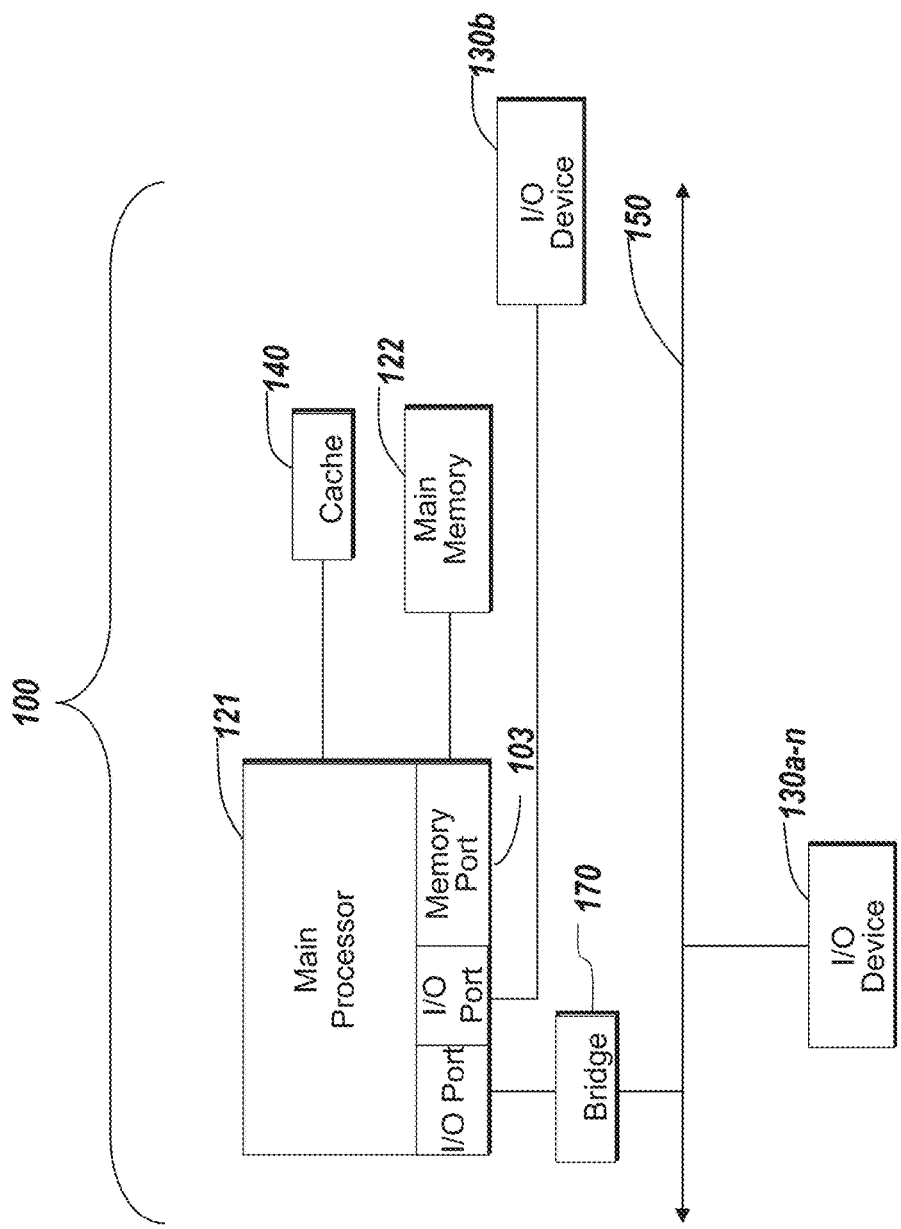

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a data pipeline processing system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provides for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the screenshot linking system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Secure Scalable Data Ingestion Pipeline

IoT is the inter-networking of devices embedded with electronics, software, sensors, actuators, and network connectivity, which enable these devices to exchange data. A IoT platform or system can communicate with the IoT devices and other IoT platforms or systems and receive streams of data. With millions of devices being connected to an IoT platform, the IoT platform needs to be capable of collecting millions or billions of messages received from these devices. In addition, the IoT platform may need to preserve message ordering to avoid inconsistency in the received data. Further, the IoT platform may need to provide the received messages a reasonable or configurable lifetime such that the reprocessing of the messages can be carried out at a later time. The IoT platform may also have to be scalable and fault tolerant to adjust to an increase in the amount of data received and to reliably store and retrieve the received data.

Figure 2:
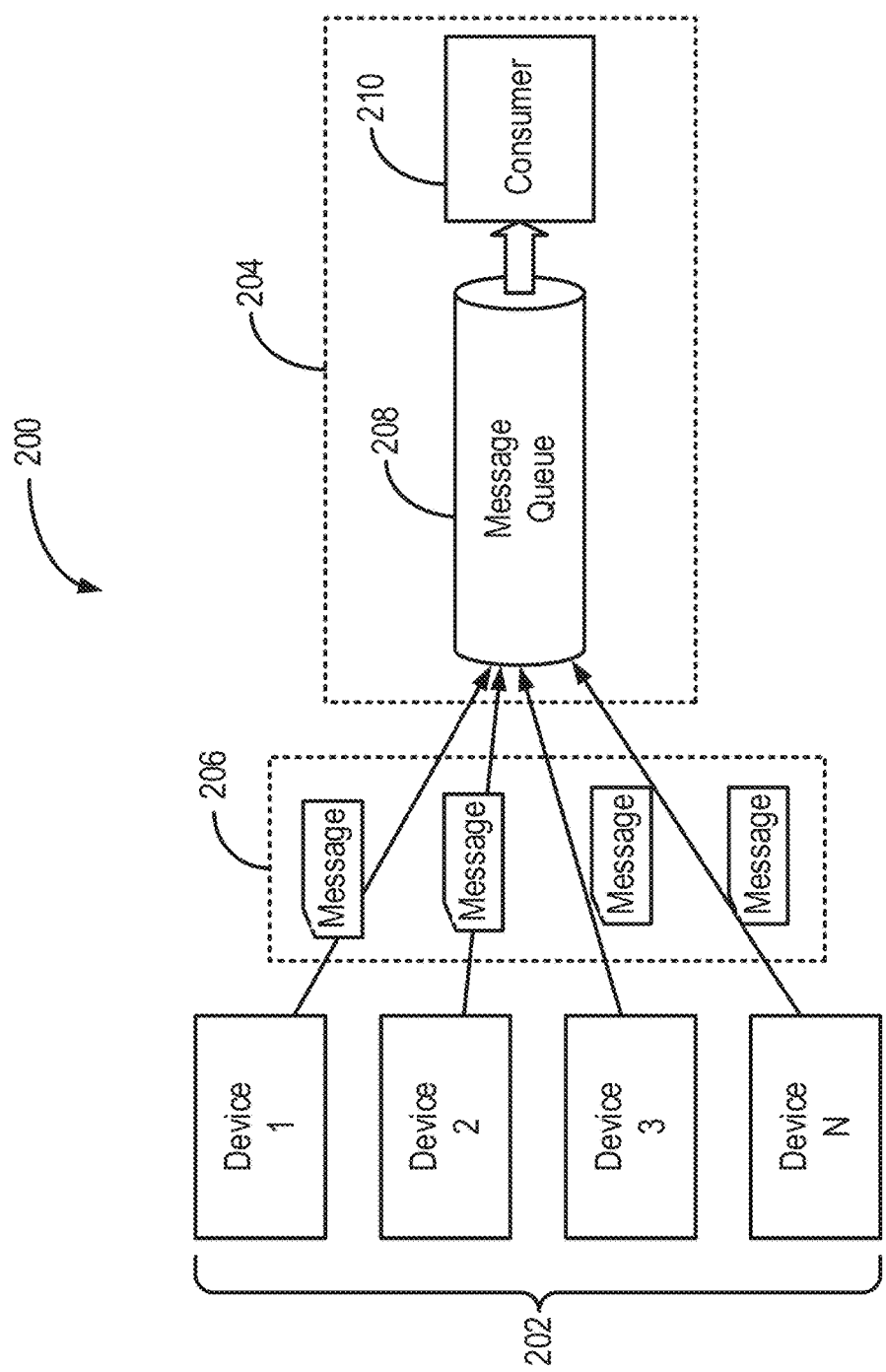
FIG. 2 illustrates an example IoT platform including IoT devices communicating with a data pipeline over a network.

FIG. 2 shows an example IoT platform 200. The IoT platform 200 includes devices 202 communicating over a communication network with a data pipeline 204 (also referred to as "a data pipeline platform"). The devices 202 can include N devices, such as computing devices, vehicles, smart devices, sensors, and other items that are embedded with sensors or actuators and have network connectivity. N can represent any number, such as from about 10 to about a million or more. Each of the devices 202 can transmit or receive one or more messages 206. For example, the devices 202 can generate sensor or other data and transmit the generated data in a message 206 to the data pipeline 204. The devices 202 also can receive messages that include data received from the data pipeline 204, where the data can include, for example, actuator data and instructions. The messages 206 can be communicated between the devices 202 and the data pipeline 204 over one or more communication networks including the internet.

The data pipeline can receive or ingest the messages received from the devices 202. The data pipeline 204 can include a message queue 208 and one or more consumers 210. The message queue 208 that can receive and store the messages 206, or the data therein, received from the devices 202. The message queue 208 can provide messages 206 or the data to the consumer 210, which can process the data to generate one or more results. The consumer 210 may process the messages 206 one message at a time, or may process a batch of messages 206 at a time. Further, the consumers 210 may operate in a sequential manner, such that each message is processed one after another. In some instances, the message queue architecture of the data pipeline 204 may not be able to decouple a data producer and a data consumer. The data pipeline 204 also may not have parallel data consumption features. Further, the data pipeline 204 may not be able to provide sufficient lifetime to the messages 206 after they are consumed by the consumers 210. The data pipeline 204 may also have limited ability to scale with an increase in the number of messages 206 received from the devices 202 or an increase in the number of devices 202. Further, the data pipeline 204 may suffer from low throughput.

IoT platforms, such as the one discussed above in relation to FIG. 2, can face several challenges. For example, the IoT platforms may have to be able to collect or ingest a large amount of messages at high-speed from multiple (e.g., several millions) devices. In some instances, a data pipeline can perform several operations such as stream data collection, data store, data processing, data analysis, and generating final results. With a large amount of messages received at the data pipeline, the stream data collection of the data pipeline may have to be capable to ingest the received messages. Data store operations may have to be capable of not only storing the stream data, but also supporting data consistency and final output generation. To that end, the data store operation may have to be able to decouple producers and consumers, provide persistent buffers, collect multiple streams of data, preserve message ordering, and provide parallel data consumption. The IoT platforms may also have to provide data security to the messages transferred between the devices and the data pipeline or across the IoT platform. In addition, the data pipeline may have to provide data analysis, which can include inspecting, cleaning, transforming, and modeling data with the goal of discovering useful information, suggesting conclusions, and supporting decision making. For example, the data analysis can provide interactive dashboards (interactive analytics), daily/weekly/monthly reports (batch analytics), billing or alerting system (real-time analytics), and prediction models (machine learning).

Figure 3:
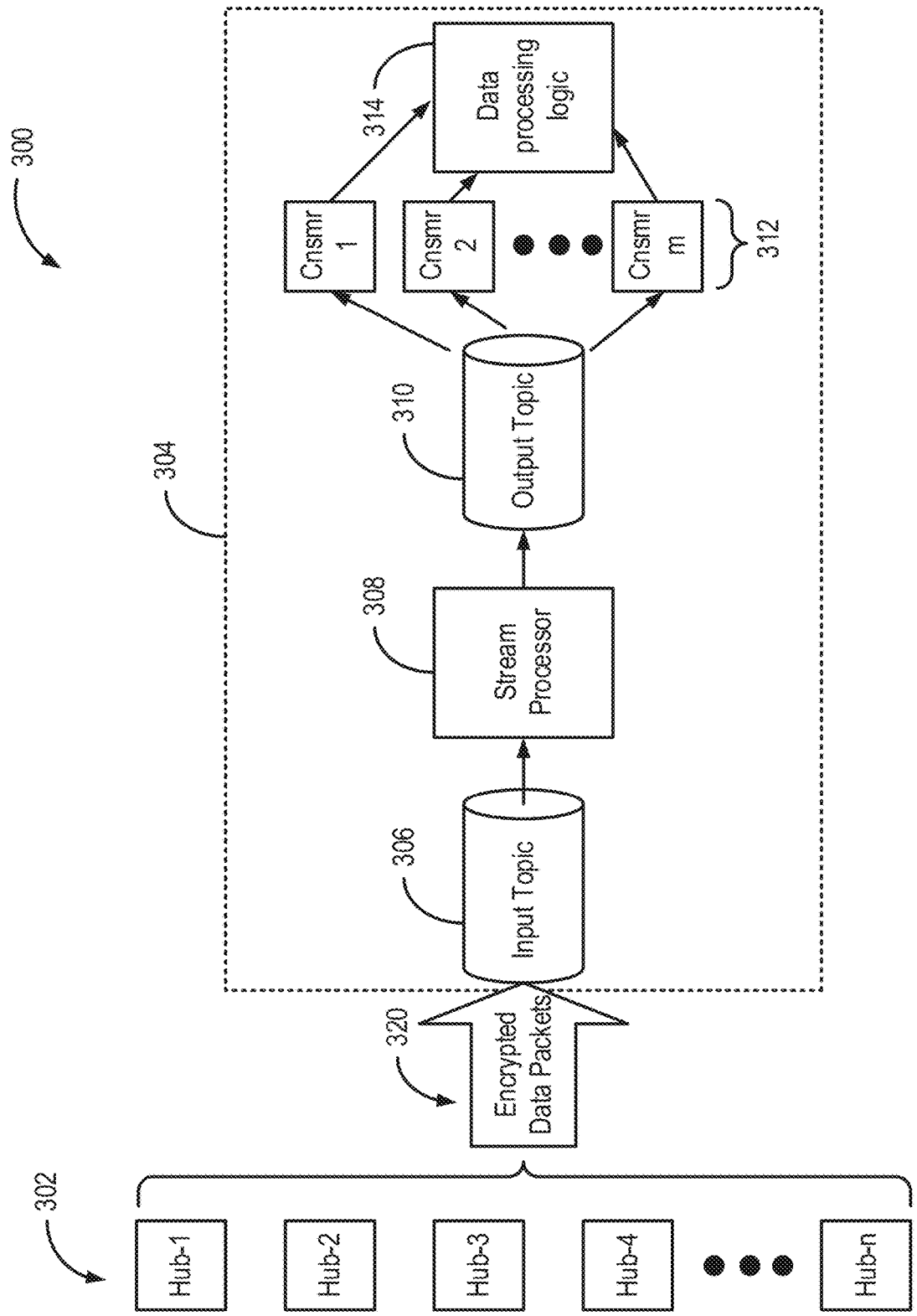
FIG. 3 illustrates another example IoT platform.

FIG. 3 illustrates an example IoT platform 300. The IoT platform 300 includes several (n) hubs 302 communicating with a data pipeline 304 over a communication network. Each hub 302 can communicate with one or more devices, and process data received from the one or more devices prior to sending the data to the data pipeline 304. The hub 302 can be an IoT device, or a device that is separate from IoT devices from which it receives data. The hub 302 can also be incorporated in an IoT device. In some embodiments, a hub 302 can be substituted for an IoT device capable of functioning as a hub. Each hub 302 can aid in improving the security of the data transmitted to the data pipeline 304. For example, each hub 302 can encrypt data, and transform the data in a format suitable for transmission to the data pipeline 304. Additional details of the data security provided by the hubs 302 is discussed further below. In some embodiments, the IoT platform 300 can be implemented using devices and systems discussed above in Section A.

The IoT Platform, or any portions thereof, may generate and assign unique keys to each of the IoT devices/hubs. In some embodiments, the IoT Platform, or any portions thereof, may generate and assign unique keys to any groups or sets of the IoT devices/hubs. These unique keys may be an API key for the IoT device/hub to be authenticated to and access the platform such as via any API calls to provide data. The unique key or API key may be randomly generated. The unique key or API key may be generated based on applying a function or hash to any information of or about an entity or tenant (such as name of entity, domain name, IP address, etc.) associated with the IoT devices or otherwise registered to use the platform. The unique key or API key may be preconfigured or integrated into the IoT device such as by a function or hash of a hardware identifier. The unique key or API key may be provided by the platform to the IoT device as part of establishing the secure connection or as part of a handshake or other secure protocol or mechanism between the platform and IoT device.

The data pipeline 304 receives the encrypted data or messages from the various hubs 302 and processes the encrypted data or messages. The data pipeline 304 can be designed as a distributed system located in a cloud computing environment and accessible over one or more networks. In some embodiments, the data pipeline 304 can be implemented on one or more servers connected to a network. The data pipeline 304 can provide high data throughput for publishing and subscribing to data streams, and can support multiple subscribers. The data pipeline 304 also can maintain received messages or data persistently in storage such that the data can be used for batch consumption (e.g., an Extract-Transform-Load process) and real-time processing.

The data pipeline 304 can be implemented using a stream processing system. For example, a stream processing systems such as Apache Kafka can be used. In some embodiments, other stream processing systems such as Amazon's Kinesis, Google's Dataflow, and Microsoft Azure's Stream Analytics may also be used. The data pipeline 304 can include an input data topic 306, a stream processor application programmable interface (API) 308, an output data topic 310, consumers 312, and data processing logic 314. The data pipeline 304 can also include a data interface and producers, which are discussed further below. The data pipeline 304 can maintain multiple input topics and multiple output topics. For example, the data pipeline 304 can maintain one input topic associated with String/Character data payload and another input topic associated with a binary data payload. Similarly, the data pipeline 304 can maintain multiple output topics associate with different subscribers. The stream processors 308 can process data form multiple input topics and provide processed data to multiple output topics. Thus, the data pipeline can provide the ability to combine different types of data to generate output data desired by the subscribers.

The data pipeline 304 can stores the encrypted message from the hubs 302 in first topic, which can be referred to as a raw data topic (or the input data topic 306). A strong encryption mechanism can be used to avoid potential eavesdropping on both the data transmission 320 and the data pipeline 304.

In the data pipeline 304, a topic is a category or feed name of one or more partitions to which records are published. Topics can be multi-subscriber; that is, a topic can have zero, one, or many consumers that subscribe to the data written to it. For each topic, the data pipeline 304 can maintain one or more partitions and a partitioned log associated with the one or more partitions. Each partition is an ordered, immutable sequence of records that is continually appended to—such as a structured commit log. For example, a partition log can include a time log of three partitions associated with an input topic. The records in the partitions are each assigned a sequential ID-number called the offset that uniquely identifies each record within the partition. The data pipeline 304 retains all published records—whether or not they have been consumed—using a configurable retention period. For example, if the retention policy is set to two days, then for the two days after a record is published, it is available for consumption, after which it will be discarded to free up space. The data pipeline's 304 performance can be effectively constant with respect to data size so storing data for a long time may not be a constraint.

The data pipeline 304 can generate multiple partitions for each topic based on one or more categories. The topics may be classified into predetermined categories by the system. The topics may be configured into the system for one or more producers. The system may automatically generate topics by classifying data received by the system into categories based on the type of data and/or type of IoT device 302. For example, the data pipeline 304 can generate partitions based on the type of data received at each input topic. In one example, the data pipeline 304 can generate a partition each for temperature, pressure, and humidity data received from various temperature, pressure, and humidity sensors at a location. Thus, a first partition can include temperature data, a second partition can include pressure data, and the third partition can include humidity data. The data pipeline 304 may also reconfigure the partitions such that the each partition is provided with data from all sensors at the same location. In some embodiments, the data pipeline 304 can include producer APIs that can store received data into the appropriate partitions of one or more input topics. As an example, the data pipeline 304 can include tens or hundreds or more producers that can allow configuring received data into desired number and types of partitions and/or corresponding topics.

The data stream processor API 308 allows for performing continuous computation on input coming from one or more input data topics 306 and sends output to zero or more output data topics 310. The input data topic 306 can be an encrypted data stream, and the computation performed by the data stream processor API 308 is to decrypt messages in the input data topic 306 and send it to the output data topic 310. In some embodiments, the data stream processor 308 can convert format of data received from multiple hubs into a uniform format. For example, the various hubs 302 can have various encryption schemes or formatting schemes. However, the consumer of the data may desire the data received from the various hubs 302 to be presented in a single format. In some such embodiments, the stream processor 308 can convert data in various formats associated with various input topics into a uniform format output topic desired by the consumers. In some embodiments, the stream processor 308 may execute several protocol engines associated with the protocols used by different hubs 302 or different input topics, and convert the protocols into one or more protocols desired by the consumers. For example, the stream processor 308 can convert data received in different versions the real time transport protocol (RTP) into a uniform version of the RTP and send it to the output topic 310. In some embodiments, the data stream processor 308 can process the data received form the input topic 306 to include metadata before providing the data to the output topic 310. The metadata can include data associated with a hub, a consumer, an IoT device, a consumer, and the like. The metadata can be utilized downstream by the output topic 310, the consumers 312 or the data processing logic 314 to process the data.

An output data stream at the output data topic 310 can be processed further using the data processing logic 314. The output data topic 310 in the data pipeline 304 can provide message subscription from multiple consumer groups. Each consumer group can contain the multiple consumers. As shown in FIG. 3, multiple consumers 312, such as applications or application modules, consume records from the same output data topic 310 without performance implication. For example, an event engine module can generates real time events, and an analysis engine module can read data for analysis from the same output data topic 310. Each consumer can consume data form a partition of the output topic 310 at any offset. For example, the consumer may choose to access the most recent record in the partition or any previous record by selecting the appropriate offset. The data pipeline 304 can store all data received form the hubs 302, allowing the consumers to access any historical data using the appropriate offset.

The IoT platform 300 shown in FIG. 3 provides several advantages. It eases decoupling data producers from data consumers, it provides support for parallel data consumption, it provides durable lifetime for messages so that the messages are available for re-processing even after consumption, it eases horizontal scaling, it improves data throughput by using partitioning, and provide end-to-end data security. For example, partitioning topics allows parallelization of the topic by splitting the data in a particular topic across multiple brokers. Each partition can be placed on a separate machine to allow for multiple consumers to read from a topic in parallel. Consumers can also be parallelized so that multiple consumers can read from multiple partitions in a topic allowing for very high message processing throughput.

Figure 4:
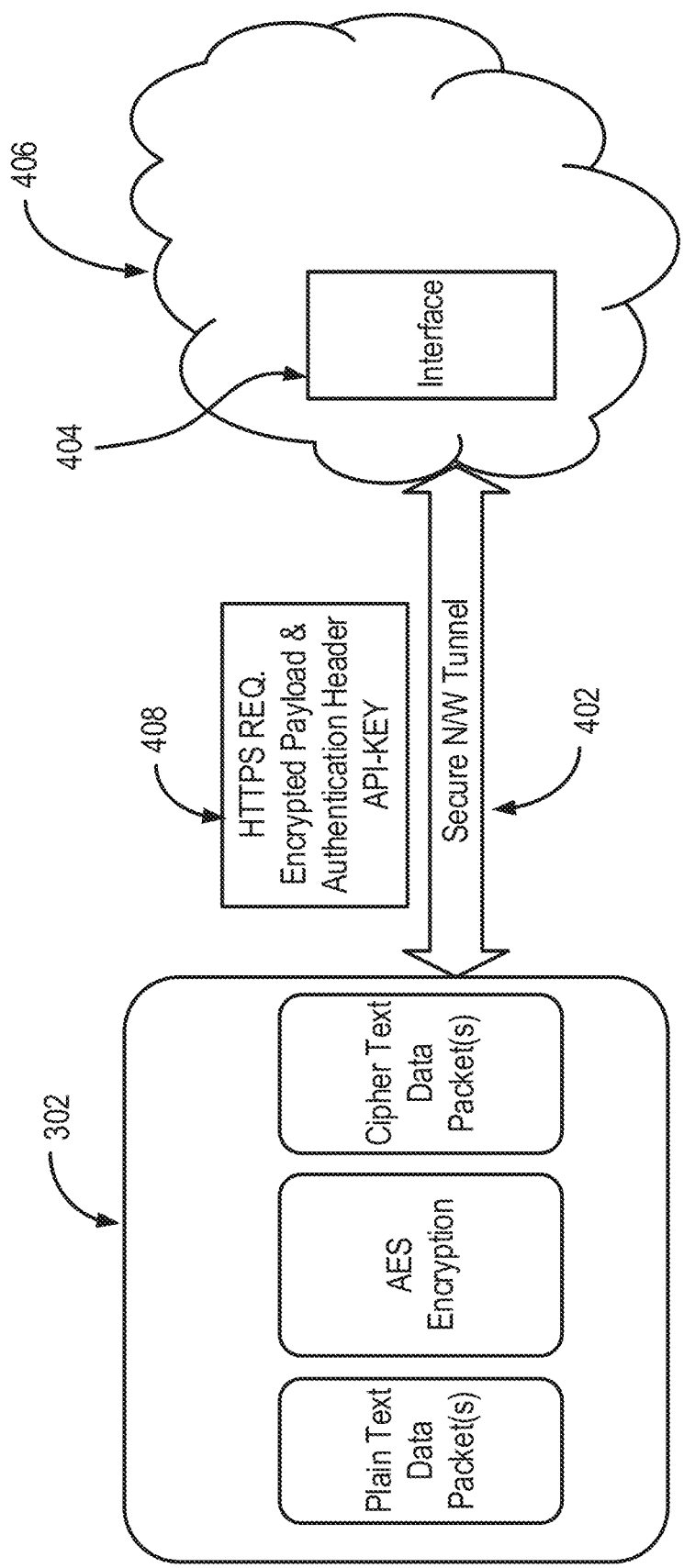
FIG. 4 illustrates a schematic of data transfer in the IoT platform shown in FIG. 3.

FIG. 4 illustrates a schematic of data transfer in the IoT platform 300 shown in FIG. 3. In particular, FIG. 4 shows a hub 302 communicating with an interface 404 over a secure tunnel 402. The interface 404 is located, for example, in a cloud 406, such as a cloud supporting the data pipeline 304 shown in FIG. 3. The interface 404 may, in some embodiments, be a REST (Representational state transfer (REST) or RESTful) interface and provides interoperability between computer systems on the Internet. In some implementations, the interface 404 can allow requesting systems to access and manipulate textual representations of Web resources using a uniform and predefined set of stateless operations. While FIG. 4 shows an interface 404, it is understood that any type and form of interface, such as interfaces other than REST can be utilized. For example, interfaces such as SOAP (simple object access protocol) and CQRS (command query responsibility segregation) can be utilized.

The IoT Devices/hubs 302 can capture real time data and send the data it to the data pipeline 304 in the cloud 406 for further monitoring, analysis, and processing. The data from IoT devices/hubs 302 can be communicated over unsecure networks, such as, e.g., the Internet. As a result, there is potential risk of eavesdropping. The IoT platform 300 provides two levels of security to protect the data being transmitted from the IoT devices/hubs 302 to the data pipeline 304. First, at an application layer level and second at a transport layer level. On application layer level payload of the data is encrypted using a symmetric algorithm, such as, for example, the AES algorithm. At the transport layer level, data is transmitted over the network in secure channel using a transport layer security protocol, such as, for example, SSL, TLS 1.2 or 1.3.

As shown in FIG. 4, data can be wrapped and sent over a network for secure communication. The IoT device/hub 302 can generate data, or gather data from other machines/devices and/or sensors sensing characteristics of the physical world and/or environment. The IoT device/hub 302 may be configured to use or call an API or interface of the system to provide or communicate the data sensed, collected, identified or generated by the device 302. The data may be processed, formatted and/or converted to a meaningful, configured or predetermined format on the device, such as, for example, using the calibration settings to convert gathered data into calibrated data (e.g., human understandable/calibrated data). The IoT device/hub 302 may stream data in real-time as the data is generated. The IoT device/hub 302 may communicate data at regular intervals or on a scheduled basis. The IoT device/hub 302 may communicate data at the request of (or responsive to) the data pipeline system or a producer.

The IoT device/hub 302 can include a key such as a symmetric key (e.g., a unique key combination with hash of a unique identifier of that device. The symmetric key may be derived or generated from any combination of a unique key and a unique device identifier for the IoT device 302. The symmetric key may be derived or generated as a hash or other function applied to one part of the combination, the entire combination or any portion(s) thereof. The unique identifier of the device may be the Media Access Control (MAC) address of the device. The unique identifier of the device may comprise a hardware identifier, such as a hardware identifier generated by an operating system for the device, for example, upon booting of the system. The unique identifier may comprise any one or more or combination of one or more of the hardware identifiers generated or identified by the operating system. For example, the unique identifier may comprise any one or more or combination of one or more of the following hardware identifiers: manufacturer, family, product name, vendor (BIOS information), BIOs Version, System BIOs major and/or minor release, enclosure type, SKU number, baseboard manufacturer and/or baseboard product. In some embodiments, the unique key is the API Key. In other embodiments, the unique key is a randomly generated key. The key can be stored in a non-volatile memory such as a ROM, flash drive, hard disk drive. In some embodiments, the memory can be tamper resistant.

The IoT device/hub 302 can use a symmetric algorithm, such as, for example, AES, DES, and 3DES, to convert data into the cipher text. The IoT device/hub 302 can prepare a HTTP or any other type of application layer data request (also generally referred to as "an application layer request") for posting, pushing or otherwise providing the data to the data pipeline 304 in the cloud 406. This data request may include the cipher text as payload and also contains an authentication header. The authentication header allows data from the device to be acceptable and identifiable at the data pipeline 304. The header can include authentication parameters, such as, the API-Key, which authenticates the identity of IoT device/hub 302.

A client, such as, for example, an application layer client running any type of application layer protocol (such as, for example, HTTP, RTP, RTSP, SSH, SNMP) running on the IoT device/hub 302 establishes a secure connection channel 402 between the IoT device/hub 302 and data pipeline 304 on the cloud 406. The secure connection 402 can be established using the interface 404. In some embodiments, a transport layer security protocol, such as the TLS 1.2 protocol can be used. One goal of the TLS protocol is to provide privacy and data integrity between two communicating applications. In particular, the TLS protocol can ensure that the connection is private, the connection is reliable, the peer's identity can be authenticated using asymmetric or public key, cryptography, the negotiation of a shared secret is secure e.g., the negotiated secret is unavailable to eavesdroppers and for any authenticated connection the secret cannot be obtained, even by an attacker who can place himself in the middle of the connection), and the negotiation is reliable (e.g., no attacker can modify the negotiation communication without being detected by the parties to the communication).

The other end of secure channel 402 is data receiving end, which is the data pipeline 304 in the cloud 406. The first layer of interface of IoT platform 300 is a web service Interface 404. The Interface 404 acts as wrapper for the input data topic 306 and also acts as authentication provider. The Interface 404 performs following tasks. The Interface expects an API-KEY in a header part of an application layer request, such as an HTTPS Data Request. If the API-KEY is not available in the request, the platform or the interface 404 rejects the incoming request. Even if, the API_KEY is present, but is not a valid key, the interface 404 rejects the request. If the request contains the valid API_KEY, the interface 404 accept the data request, collects the incoming API_KEY and payload from the request, and passes the payload to a producer. Authentication is carried out based on the API-KEY, which is allocated to every IoT device/hub 302. As shown in FIG. 4, the API_KEY is included in a header 408, although the API_KEY may be included or provided as part of the payload, or in an out of band message or upon establishing the secure tunnel connection.

Figure 5:
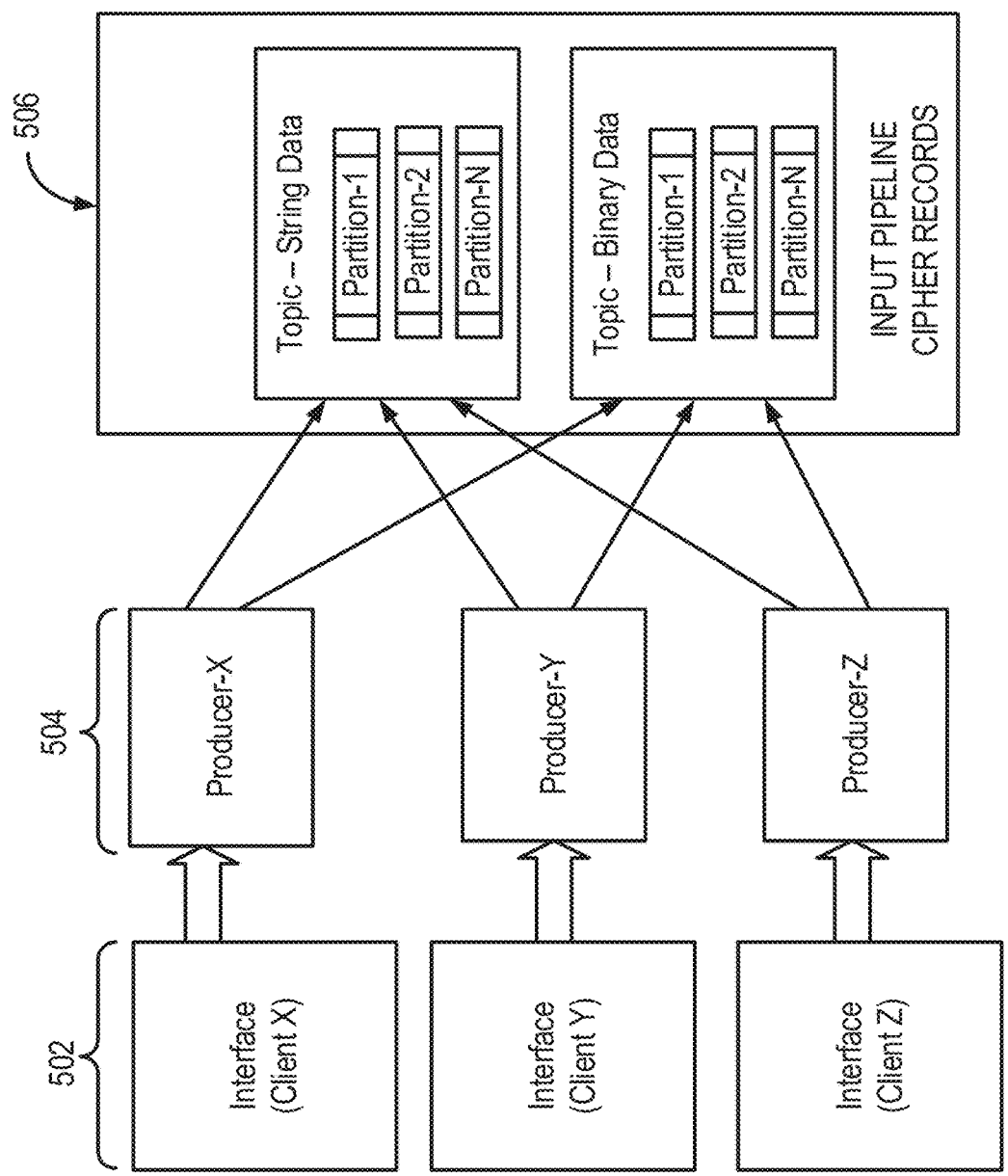
FIG. 5 illustrates a portion of the data pipeline of an IoT platform shown in FIG. 3.

FIG. 5 illustrates a portion of the data pipeline 304 of an IoT platform 300 shown in FIG. 3. In particular, the data pipeline 304 includes interfaces 502 (interface (Client-X), interface (Client-Y), and interface (Client-Z), producers 504 (producer-X, producer-Y, and producer-X), and an input pipeline 506. The interfaces 502 can be similar to the interface 404 discussed above in relation to FIG. 4. The input pipeline 506 can include input data topics, similar to the input data topic 306 discussed above in relation to FIG. 3.

Producers 504 can publish data to the topics of their choice or to a predetermined one or more topics configured on the system, such as for that producer or for multiple producers. A producer is responsible for choosing which record to assign to which partition within the topic. This can be done in a round-robin fashion to balance load or it can be done according to some semantic partition function (say based on some key in the record). The producer is also responsible for choosing which record to assign to which partition within the topic. There can be a multiple types of topics, such as, for example, one for a String/Character data payload and another for a binary data payload.

The data received from the IoT devices/hubs is submitted to input pipeline 506 by the producers 504. This input pipeline 506 contains the encrypted records received from the IoT devices/hubs. Messages sent by a producer 504 to a particular topic partition can be appended in the order they are sent. For example, if a record M1 is sent by the same producer as a record M2, and M1 is sent first, then M1 will have a lower offset than M2 and appear earlier in the log. A consumer instance sees records in the order they are stored in the log. For a topic with replication factor N, N−1 server failures can be tolerated without losing any records committed to the log. This ensures that the records submitted to a topic are not lost.

Figure 6:
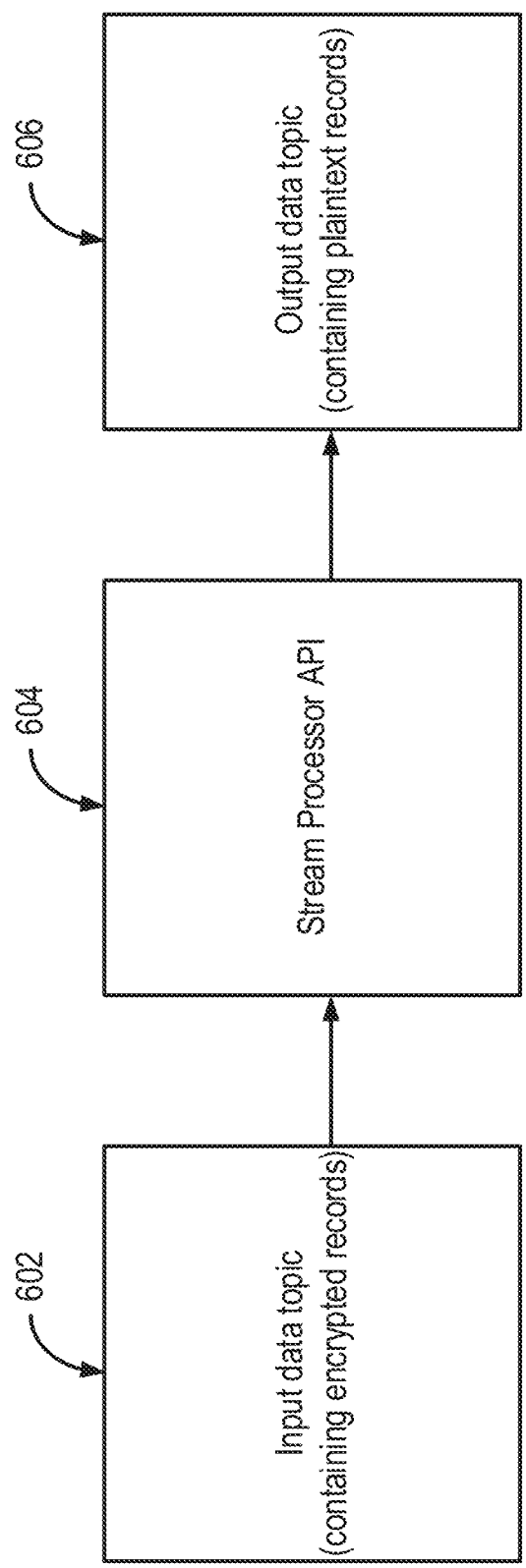
FIG. 6 illustrates another portion of the data pipeline of an IoT platform shown in FIG. 3.

FIG. 6 illustrates another portion of the data pipeline 304 of an IoT platform 300 shown in FIG. 3. In particular, FIG. 6 shows an input data topic 602, a stream processor API 604, and an output data topic 606. The input data topic 602, the stream processor API 604, and the output data topic 606 can be similar to the input data topic 306, the stream processor API 308, and the output data topic 310 shown in FIG. 3.

In the data pipeline 304, a stream processor API 604 is a client library for processing and analyzing data stored in the data pipeline 304 and either writes the resulting data back to the data pipeline 304 or send the final output to an external system. In some embodiments, a stream processor API such as Apache Kafka Streams can be used to implement the stream processor API 604. The stream processor API 604 builds upon stream processing concepts such as properly distinguishing between event time and processing time, windowing support, and simple yet efficient management of application state. The stream processor API 604 has a low barrier to entry: one can quickly write and run a small-scale proof-of-concept on a single machine; and may only need to run additional instances of the particular application on multiple machines to scale up to high-volume production workloads. The stream processor API 604 transparently handles the load balancing of multiple instances of the same application by leveraging the data pipeline's 304 parallelism model. The stream processor API 604 is designed as a simple and lightweight client library, which can be easily embedded in any Java application and integrated with any existing packaging, deployment and operational tools that users have for their streaming applications. The stream processor API 604 may have no external dependencies and can use a partitioning model to horizontally scale processing while maintaining strong ordering guarantees. The stream processor API 604 supports fault-tolerant local state, which enables very fast and efficient stateful operations like joins and windowed aggregations. The stream processor API 604 employs one-record-at-a-time processing to achieve low processing latency, and supports event-time based windowing operations. The stream processor API 604 offers necessary stream processing primitives, along with a high-level Streams DSL and a low-level Processor API. The role of the stream processor API 604 is to read data from the input data topic 602 and send the read data to the output data topic 606. The stream processor may convert or format the data from the format or protocol of the input topic to the format or protocol of the output topic.

The stream processor API 604 may be customized lightweight code, which performs the role of reading records from the input data topic 602, decrypting the records, and sending the decrypted records to the output data topic 606. The stream processor API 604 reads one record from the input data topic 602. Each record contains the API-KEY and Cipher text payload data. The record is read by the stream processor API 604 from the input data topic 604, which contains the API-KEY, by using the API KEY and determines the symmetric decryption key for that record. The stream processor API 604 holds the details of each API-KEY. Each API KEY represents the authenticity and identity of a particular device. From that API KEY the stream processor API 604 can get the information like device MAC ADDRESS, SYMMETRIC KEY, Device type etc. When the record accepted for decryption, by using the API-KEY the stream processor API 604 first finds out the AES Symmetric key for cipher text decryption. Symmetric Key is combination of the unique key associated for the device plus hash of unique device or hardware identifier. For example, Symmetric Key=Unique Key+HASH (MAC Address). The stream processor API 604 then decrypts the records and passes that record to the output data topic 606. In this manner, records are available in the output data topic 606 for different consumers for further processing.

The output data topic 606 contains the records/messages which are processed by the stream processor API 604 In some implementations, every message/record present in this output data topic 606 is in plain text. In comparison, in some implementations, every message/record present in the input data topic may be encrypted. The output data topic is useful as a source of data for many of the consumers. This has several advantages. For example, a multiple consumer can use this data for further processing. It's having the configurable retention time for a record. So if any consumer wants to reprocess the record then, the record will available for re-processing.

Consumers can label themselves with a consumer group name, and each record published to a topic is delivered to one consumer instance within each subscribing consumer group. Consumer instances can be in separate processes or on separate machines. If all the consumer instances have the same consumer group, then the records will effectively be load balanced over the consumer instances. If all the consumer instances have different consumer groups, then each record will be broadcast to all the consumer processes.

In some instances, topics can have a small number of consumer groups, one for each "logical subscriber". Each group is composed of many consumer instances for scalability and fault tolerance. This is similar to publish-subscribe semantics, where the subscriber is a cluster of consumers instead of a single process. The way consumption is implemented, is by dividing up the partitions in the log over the consumer instances so that each instance is the exclusive consumer of a "fair share" of partitions at any point in time. This process of maintaining membership in the group is handled by the IoT platform. If new instances join the group they will take over some partitions from other members of the group; if an instance dies, its partitions will be distributed to the remaining instances.

In the IoT platform discussed above, the consumer can be a different applications or systems which requires the data for further processing. Some example of such an application can be a monitoring dashboard, real time event generation application, batch processing analysis application, etc. Any consumer may be configured to take any type of action upon consuming or reading a record from an output topic. The consumer may take an action or apply a function to any of the data consumed from records of the output topic as designed and configured according the functionality, logic and/or operation of the application of the consumer. In some implementations, the consumer may display information about the data consumed on a graphical user interface such as for a monitoring dashboard. For example, the information about data sensed or collected by one or more IoT devices/hubs may be aggregated and displayed in a desired or predetermined format for comparison and/or analysis and the like. In some implementations, the consumer may generate any type and form of alarm and communicate any data to device(s) of one or more users based on the alarm. In some implementations, the consumer may generate any type and form of event and communicate any data to device(s) of one or more users based on the event.

In some implementations, the consumer may make API or interface calls to other systems, such as providing the consumed data or selected portions thereof to another software tool or analysis tool. In some implementations, the consumer may make API or interface calls to other devices or systems, such as to control the operation or performance of a machine, device or tool, such as on a manufacturing automation line or system or tool. In some implementations, the consumer may make API or interface calls to any of the IoT devices/hubs based on or using the consumed data.

An IoT platform can face several challenges, such as collecting data from a large number of devices/events, a persistent buffer storing the data and making the data available for further processing and analysis. This has done using the stream processing pipeline discussed above. As there is an ever increasing number of IoT devices/sensor/things being connected to the internet, data security is desirable. One mechanism to protect data information of IoT devices is use encryption mechanism. Messages sent from the IoT device can be encrypted and the IoT platform which collecting data can have the capability to decrypt and provide service without performance impact. The IoT platform can have high operational throughput and low latency.

What is claimed is:

1. A method for securely ingesting data from a plurality of devices over one or more networks, the method comprising:
   (a) establishing, by a data pipeline platform executing on one or more servers, a secure tunnel connection with a plurality of devices, each of the of the plurality of devices assigned by the data pipeline platform a unique application programming interface (API) key;
   (b) receiving, by the data pipeline platform, an application layer request over the secure tunnel connection via one or more networks from a device of the plurality of devices, the application layer request comprising an encrypted message from the device;
   (c) determining, by the data pipeline platform, that the application layer request comprises the unique API key assigned to the device in a predetermined authentication header of the application layer request;
   (d) accepting, by the data pipeline platform, responsive to the determination, the application layer request;
   (e) using, by the data pipeline platform responsive to accepting the request, the unique API key of the device to determine an encryption key to decrypt the encrypted message to a message; and
   (f) storing, by the data pipeline platform responsive to accepting the application layer request, the message to a first partition of a plurality of partitions corresponding to an input data topic.

2. The method of claim 1, further comprising processing, by a data stream processor, the message as input from the first partition and storing an output from processing to a second partition of the plurality of partitions corresponding to an output data topic.

3. The method of claim 2, further comprising subscribing, by a plurality of consumer applications, to the output data topic of the second partition receive output data published to the second partition.

4. The method of claim 2, further comprising obtaining, by a consumer application, a batch of records at a time from the output data topic of the second partition.

5. The method of claim 1, wherein the plurality of devices comprises one or more of the following: a hub device, an Internet of Things (IoT) device, a sensor, a vehicle and a computing device.

6. The method of claim 1, wherein the data pipeline platform executes on one or more servers in one of a cloud or Software-As-A-Service computing environment and provides an API for the plurality of devices to communicate with the data pipeline platform.

7. The method of claim 1, wherein (c) further comprises authenticating, by the data pipeline platform, the plurality of devices based at least on the unique API key.

8. The method of claim 1, wherein (e) further comprises determining the encryption key as a symmetric key comprising the unique API key combined with a hash of a unique identifier of the device.

9. The method of claim 1, wherein each of the plurality of partitions comprises an ordered immutable sequence of records.

10. The method of claim 1, further comprising maintaining, by the data pipeline platform, records in each of the plurality of partitions for a configured lifetime to enable re-consumption by one or more consumer applications.

11. A system for securely ingesting data from a plurality of devices over one or more networks, the system comprising:
  a data pipeline platform executing on one or more servers, wherein the data pipeline platform is configured to:
  establish a secure tunnel connection with a plurality of devices, each of the of the plurality of devices assigned by the data pipeline platform a unique application programming interface (API) key;
  receive an application layer request over the secure tunnel connection via one or more networks from a device of the plurality of devices, the application layer request comprising an encrypted message from the device;
  determine that the application layer request comprises the unique API key assigned to the device in a predetermined authentication header of the application layer request;
  accept the application layer request responsive to the determination;
  use the unique API key of the device to determine, responsive to accepting the application layer request, an encryption key to decrypt the encrypted message to a message; and
  store, responsive to accepting the application layer request, the message to a first partition of a plurality of partitions corresponding to an input data topic.

12. The system of claim 11, further comprising a data stream processor configured to process the message as input from the first partition and storing an output from processing to a second partition of the plurality of partitions corresponding to an output data topic.

13. The system of claim 12, wherein a plurality of consumer applications are subscribed to the output data topic of the second partition to receive output data published to the second partition.

14. The system of claim 12, the data pipeline platform is further configured to obtain, by a consumer application, a batch of records at a time from the output data topic of the second partition.

15. The system of claim 11, wherein the plurality of devices comprises one or more of the following: a hub device, an Internet of Things (IoT) device, a sensor, a vehicle and a computing device.

16. The system of claim 11, wherein the data pipeline platform is configured to execute on the one or more servers in one of a cloud or Software-As-A-Service computing environment and provide an API for the plurality of devices to communicate with the data pipeline platform.

17. The system of claim 11, wherein the data pipeline platform is further configured to authenticate the device based at least on the unique API key.

18. The system of claim 11, wherein the data pipeline platform is further configured to determine the encryption key as a symmetric key comprising the unique API key combined with a hash of a unique identifier of the device.

19. The system of claim 11, wherein each of the plurality of partitions comprises an ordered immutable sequence of records.

20. The system of claim 11, wherein the data pipeline platform is further configured to maintain records in each of the plurality of partitions for a configured lifetime to enable re-consumption by one or more consumer applications.

* * * * *